(12) United States Patent
Toyama (10) Patent No.: US 11,506,679 B2
(45) Date of Patent: Nov. 22, 2022

(54) ENCODER, MOTOR, AND ROBOT

(71) Applicant: Seiko Epson Corporation, Tokyo (JP)

(72) Inventor: Mitsuru Toyama, Azumino (JP)

(73) Assignee: SEIKO EPSON CORPORATION

( * ) Notice: Subject to any disclaimer, the term of this patent is extended or adjusted under 35 U.S.C. 154(b) by 107 days.

(21) Appl. No.: 16/841,749

(22) Filed: Apr. 7, 2020

(65) Prior Publication Data

US 2020/0319224 A1 Oct. 8, 2020

(30) Foreign Application Priority Data

Apr. 8, 2019 (JP) .............................. JP2019-073589

(51) Int. Cl.
| | |
|---|---|
| *G01P 3/48* | (2006.01) |
| *G01P 3/44* | (2006.01) |
| *G01P 3/487* | (2006.01) |
| *H02K 11/215* | (2016.01) |
| *B25J 13/08* | (2006.01) |

(52) U.S. Cl.
CPC ............. *G01P 3/487* (2013.01); *B25J 13/088* (2013.01); *G01P 3/443* (2013.01); *H02K 11/215* (2016.01)

(58) Field of Classification Search
CPC ................................. G01P 3/487; G01P 3/443
See application file for complete search history.

(56) References Cited

U.S. PATENT DOCUMENTS

| | | | | |
|---|---|---|---|---|
| 7,868,611 B2* | 1/2011 | Sano | ........................ | G01B 7/30 324/207.25 |
| 8,878,125 B2* | 11/2014 | Miyajima | ............ | G01D 5/3473 250/231.15 |
| 2019/0126469 A1* | 5/2019 | Motoyoshi | ............... | B25J 9/044 |
| 2019/0168389 A1* | 6/2019 | Shino | ..................... | B25J 9/0009 |
| 2019/0360845 A1* | 11/2019 | Ootake | ............. | G01D 5/34776 |
| 2020/0083784 A1* | 3/2020 | Fukuda | .................. | H02K 11/22 |

FOREIGN PATENT DOCUMENTS

JP 2014-115234 A 6/2014

\* cited by examiner

*Primary Examiner* — Reena Aurora
(74) *Attorney, Agent, or Firm* — Harness, Dickey & Pierce, P.L.C.

(57) ABSTRACT

An encoder includes a base section, a spindle gear attached to a turning shaft section, a counter-shaft gear configured to mesh with the spindle gear and including a cylindrical gear section, a magnet provided in the counter-shaft gear, and an annular bearing member provided in the base section and configured to support the counter-shaft gear. When a straight line extending along the shaft section is represented as a first axis and a straight line orthogonal to the first axis is represented as a second axis, the magnet is disposed to overlap the bearing member in a plan view from a direction in which the second axis extends.

8 Claims, 7 Drawing Sheets

ENCODER, MOTOR, AND ROBOT

The present application is based on, and claims priority from JP Application Serial Number 2019-073589, filed Apr. 8, 2019, the disclosure of which is hereby incorporated by reference herein in its entirety.

BACKGROUND

1. Technical Field

The present disclosure relates to an encoder, a motor, and a robot.

2. Related Art

There has been known an encoder of a battery-less type that includes a spindle gear and counter-shaft gears and calculates, based on detection results of a phase of the spindle gear and phases of the respective counter-shaft gears, rotating speed of the spindle gear coupled to a motor rotating shaft (see, for example, JP-A-2014-115234 (Patent Literature 1) described below). The encoder includes the counter-shaft gears and magnets provided in the counter-shaft gears. The counter-shaft gears are supported via bearings.

In the encoder, since the counter-shaft gears, the magnets, and the bearings are disposed side by side in a direction along the motor rotating shaft, a space for providing the counter-shaft gears, the magnets, and the bearings is necessary. Accordingly, it is difficult to reduce the size of the encoder.

SUMMARY

An encoder according to a first aspect of the present disclosure includes: a base section; a spindle gear attached to a turning shaft section; a counter-shaft gear configured to mesh with the spindle gear and including a cylindrical gear section; a magnet provided in the counter-shaft gear; and an annular bearing member provided in the base section and configured to support the counter-shaft gear. When a straight line extending along the shaft section is represented as a first axis and a straight line orthogonal to the first axis is represented as a second axis, the magnet is disposed to overlap the bearing member in a plan view from a direction in which the second axis extends.

An encoder according to a second aspect of the present disclosure includes: a base section; a spindle gear attached to a turning shaft section; a counter-shaft gear configured to mesh with the spindle gear and including a cylindrical gear section; a magnet provided in the counter-shaft gear; and an annular bearing member provided in the base section and configured to support the counter-shaft gear. When a straight line extending along the shaft section is represented as a first axis and a straight line orthogonal to the first axis is represented as a second axis, the magnet is disposed to overlap the gear section in a plan view from a direction in which the second axis extends.

In the encoder according to the aspect, the counter-shaft gear may include a recess in a position overlapping the bearing member in the plan view from the direction in which the second shaft extends, and the magnet may be disposed in the recess.

In the encoder according to the aspect, the counter-shaft gear may include a recess in a position overlapping the gear section in the plan view from the direction in which the second shaft extends, and the magnet may be disposed in the recess.

In the encoder according to the aspect, the encoder may further include a magnetism detection substrate configured to detect a change in a magnetic field due to the magnet, and the magnetism detection substrate may be provided in the base section.

In the encoder according to the aspect, the base section may include a wall section, and the wall section may be disposed between the magnetism detection substrate and the counter-shaft gear.

A motor according to a third aspect of the present disclosure includes the encoder according to the first aspect or the second aspect.

A robot according to a fourth aspect of the present disclosure includes the motor according to the third aspect.

DESCRIPTION OF EXEMPLARY EMBODIMENTS

Embodiments of the present disclosure are explained below with reference to the drawings. In the figures referred to below, scales and angles of layers and members are differentiated from actual ones in order to show the layers and the members in recognizable sizes.

First Embodiment

First, the configuration of a robot according to a first embodiment is explained. In this embodiment, the robot is a SCARA robot. The SCARA robot is called horizontal articulated robot as well. A robot 1 may be a robot of another type such as a vertical articulated robot instead of the SCARA robot. The vertical articulated robot may be a single-arm robot including one armor may be a plural-arm robot including two or more arms. A plural-arm robot including two arms is called double-arm robot as well.

Figure 1:
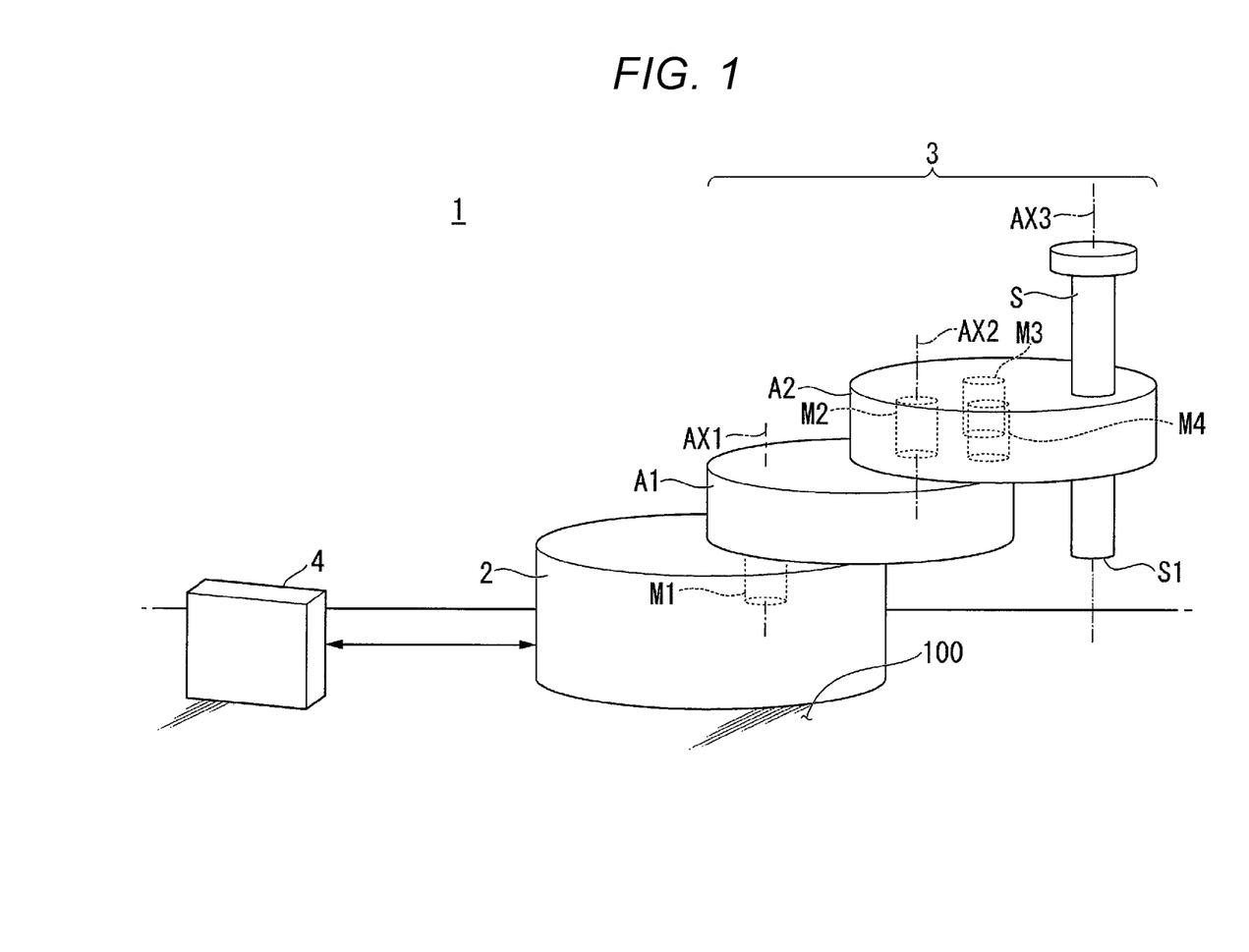
FIG. 1 is a diagram showing an example of the configuration of a robot according to a first embodiment.

FIG. 1 is a diagram showing an example of the configuration of the robot according to this embodiment.

As shown in FIG. 1, the robot 1 includes a base 2, a movable section 3, and a control device 4.

The base 2 supports the movable section 3. The base 2 is provided on a predetermined setting surface 100. The setting surface 100 is, for example, a floor surface of a room where the robot 1 performs work. The setting surface 100 may be another surface such as a wall surface of the room, a ceiling surface of the room, an upper surface of a table, a surface of a jig, or a surface of a table instead of the floor surface.

The movable section 3 includes a first arm A1, a second arm A2, and a driving shaft section S. The first arm A1 is supported to be turnable around a first turning axis AX1 with respect to the base 2. The first arm A1 is movable in a direction parallel to the setting surface 100. Turning means motion of rotating around an axis and includes rotation with a rotation angle smaller than 360 degrees and rotation with a rotation angle equal to or lager than 360 degrees. Turning is not limited to motion of rotating in one direction and includes motion of rotating in both directions.

The first arm A1 is turned around the first turning axis AX1 by a first driving section M1 provided in the base 2. The first driving section M1 is an actuator that turns the first arm A1 around the first turning axis AX1. In other words, in this embodiment, the first turning axis AX1 means an imaginary axis coinciding with a turning axis of the first driving section M1.

The second arm A2 is supported to be turnable around a second turning axis AX2 with respect to the first arm A1. The second arm A2 is movable in the direction parallel to the setting surface 100. The second arm A2 is turned around the second turning axis AX2 by a second driving section M2 provided in the second arm A2. In this embodiment, the second turning axis AX2 means an imaginary axis coinciding with a turning axis of the second driving section M2.

The second arm A2 includes a third driving section M3 and a fourth driving section M4 and supports a driving shaft section S. The driving shaft section S is supported to be turnable around a third turning axis AX3 and translatable in the axial direction of the third turning axis AX3 with respect to the second arm A2. In this embodiment, the third turning axis AX3 means an imaginary axis coinciding with the center axis of the driving shaft section S.

The driving shaft section S is a columnar shaft body. A not-shown ball screw groove and a not-shown spline groove are respectively provided on the outer circumferential surface of the driving shaft section S. In the example shown in FIG. 1, the driving shaft section S is provided in a state in which the driving shaft section S pierces through, of end portions of the second arm A2, an end portion on the opposite side of the first arm A1.

An external device such as an end effector can be attached to a distal end S1 of the driving shaft section S. The distal end S1 of the driving shaft section S is, of two end portions of the driving shaft section S, an end portion on one side in the axial direction. The end effector is, for example, an end effector capable of holding an object with a finger section. The end effector may be an end effector capable of holding an object with, for example, suction by air or attraction by magnetism. The end effector may be an end effector incapable of holding an object. Holding an object means changing a state of the object to a liftable state.

The third driving section M3 turns, via a timing belt or the like, for example, a ball screw nut provided in the outer circumferential portion of the ball screw groove of the driving shaft section S. Consequently, the third driving section M3 is capable of moving the driving shaft section S in the axial direction.

The fourth driving section M4 turns, via a timing belt or the like, a ball spline nut provided in the outer circumferential portion of the spline groove of the driving shaft section S. Consequently, the fourth driving section M4 turns the driving shaft section S around the third turning axis AX3.

In this embodiment, the first to fourth driving sections M1 to M4 respectively have the same configuration. In the following explanation, the first to fourth driving sections M1 to M4 are collectively simply referred to as driving sections M. At least one of the driving sections M is configured by a motor. The first to third turning axes AX1 to AX3 are collectively simply referred to as turning axes AX.

An XYZ coordinate system is used in the drawings used in the following explanation of a motor configuration. In the XYZ coordinate system, a plane including the X axis and the Y axis are horizontal and the Z axis is vertical. In other words, the Z axis is a straight line parallel to a straight line extending in a direction of application of the gravity, that is, the vertical straight line. The X axis and the Y axis are straight lines parallel to a straight line perpendicular to the vertical line, that is, the horizontal line. In the following explanation, a positive side of the Z axis is referred to as "upper side" and a negative side of the Z axis is referred to as "lower side". The upper side and the lower side are names for simply explaining a relative positional relation among the sections and do not limit an actual disposition relation and an actual form of use.

Figure 2:
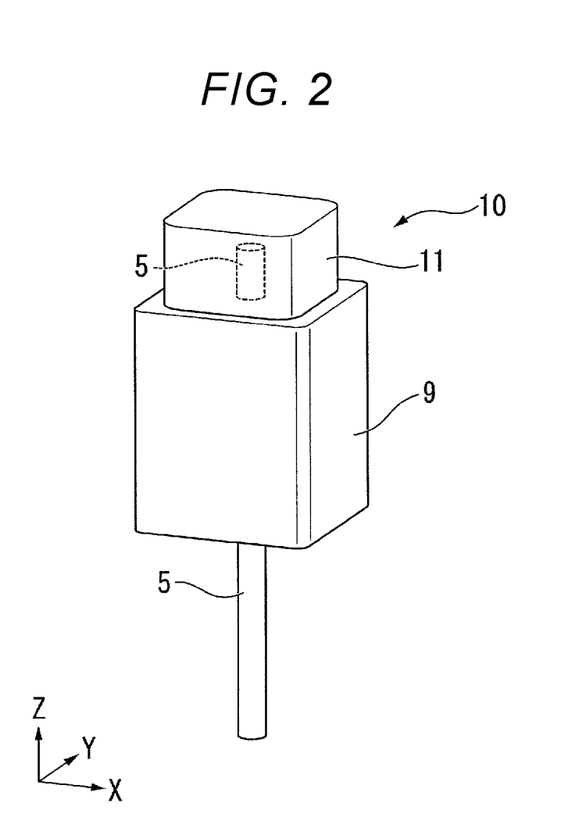
FIG. 2 is a perspective view showing a schematic configuration of a motor used in a driving section.

FIG. 2 is a perspective view showing a schematic configuration of a motor used in the driving section M. As shown in FIG. 2, a motor 10 includes a motor body 9 including a servomotor and an encoder 11 attached to an upper surface 9a of the motor body 9. The motor body 9 includes a shaft (a shaft section) 5 extending in the up-down direction. The center of the shaft 5 coincides with the center of a turning axis AX in the driving section M.

At this time, the Z axis is a straight line (a first axis) extending along the shaft 5. The X axis or the Y axis is a straight line (a second axis) orthogonal to the Z axis. The first axis is not limited to the Z axis and only has to be a straight light extending along the shaft 5 and may be, for example, a straight line parallel to the Z axis. The second axis is not limited to the X axis or the Y axis and only has to be a straight line orthogonal to the first axis and may be, for example, a straight line parallel to the X axis or a straight line parallel to the Y axis.

The encoder 11 detects rotating speed of the shaft 5 in the motor body 9. The encoder 11 is fixed to, for example, the upper surface 9a, which is the surface on the upper side of the motor body 9, via a not-shown screw member. The encoder 11 detects rotating speed of a part of the shaft 5 projecting to the upper surface 9a of the motor body 9.

The motor 10 is controlled by the control device 4 shown in FIG. 1. The control device 4 is electrically coupled to the motor body 9 and the encoder 11. The control device 4 calculates rotating speed of the shaft 5 in the motor body 9 based on information transmitted from the encoder 11 and controls the driving of the motor body 9 based on the rotating speed.

Figure 3:
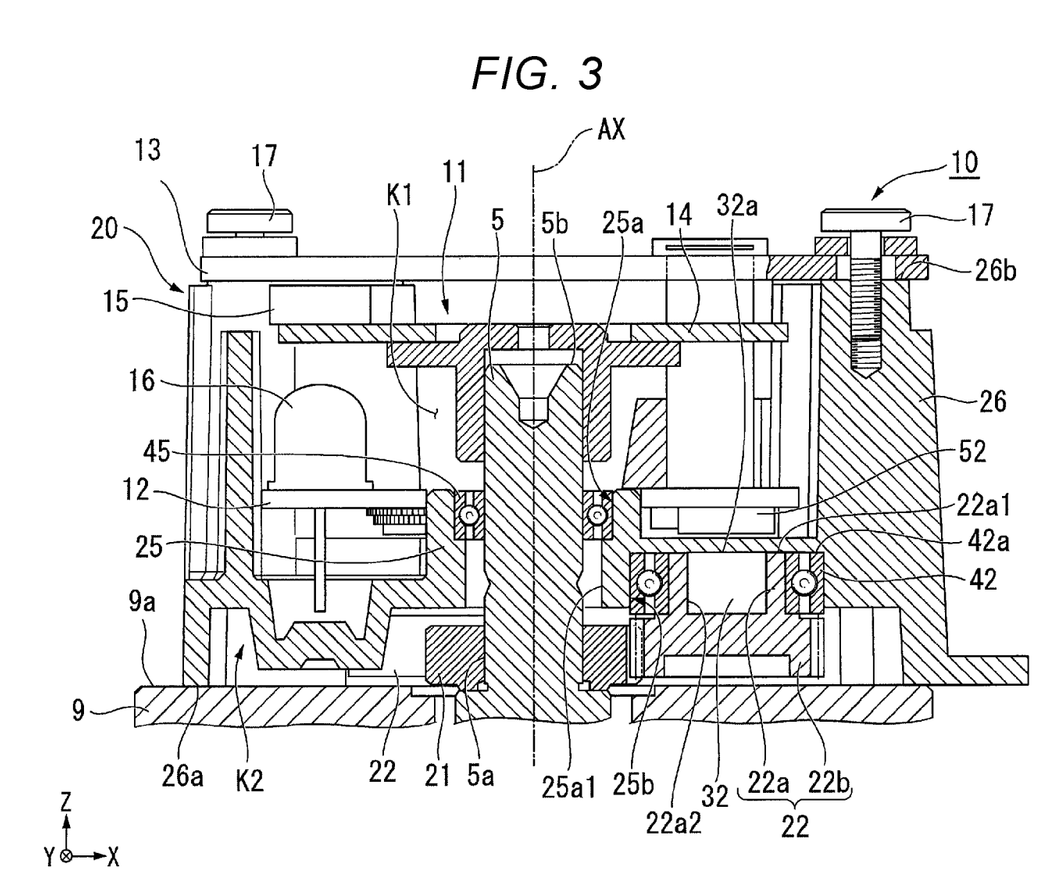
FIG. 3 is a sectional view showing a main part configuration of the motor.
Figure 4:
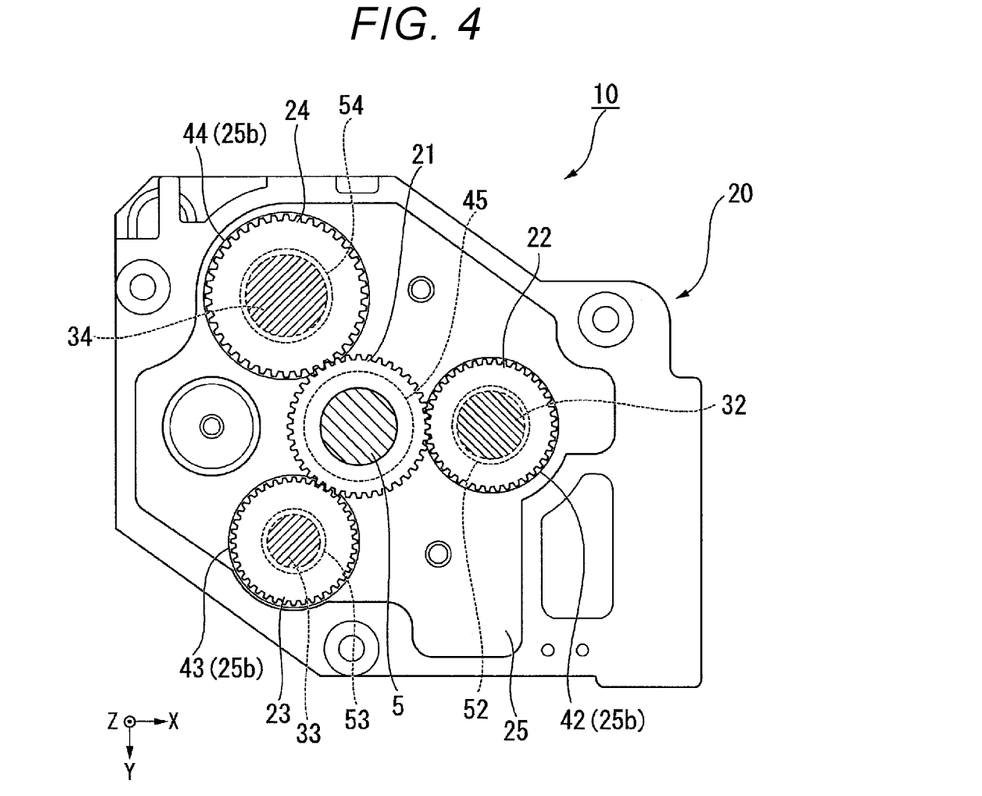
FIG. 4 is a plan view showing a main part configuration of an encoder.

FIG. 3 is a sectional view showing a main part configuration of the motor 10. FIG. 4 is a plan view showing a main part configuration of the encoder 11. FIG. 4 is a diagram showing a planar disposition relation among the members configuring the encoder 11 and is a diagram of the encoder 11 viewed from the lower side toward the upper side. In FIGS. 3 to 4, illustration of members unrelated to the explanation is omitted to clearly show the figures.

As shown in FIG. 3 or 4, the encoder 11 includes a base section 20, a spindle gear 21, a plurality of counter-shaft gears 22, 23, and 24, a plurality of magnets 32, 33, and 34, a plurality of bearings (bearing members) 42, 43, and 44, and a shaft bearing 45. The encoder 11 according to this embodiment further includes a magnetism detection substrate 12, an optical sensor substrate 13, and an encoder wheel 14.

The encoder 11 according to this embodiment has a partially unitized structure. Specifically, in the encoder 11, the base section 20, the plurality of counter-shaft gears 22, 23, and 24, the plurality of magnets 32, 33, and 34, and the plurality of bearings 42, 43, and 44 are unitized. By unitizing a part of the encoder 11 in this way, work for attaching the encoder 11 to the motor 10 explained below is facilitated.

Even when supply of power is stopped, the encoder 11 according to this embodiment is capable of calculating rotating speed of the motor 10 and an absolute position of the turning axis AX of the driving section M by detecting rotation angles of the gears 21 to 24 when electric power is supplied again later. The encoder 11 according to this embodiment is an encoder of a so-called battery-less type.

The base section 20 is made of a material having predetermined rigidity such as plastic or metal. The base section 20 is a member that retains the plurality of counter-shaft gears 22, 23, and 24, the plurality of magnets 32, 33, and 34, the plurality of bearings 42, 43, and 44, the shaft bearing 45, the magnetism detection substrate 12, and the optical sensor substrate 13.

The base section 20 includes a retaining section 25 and a peripheral wall section 26. The retaining section 25 is a member that is provided to be orthogonal to the turning axis AX and retains the plurality of counter-shaft gears 22, 23, and 24, the plurality of magnets 32, 33, and 34, the plurality of bearings 42, 43, and 44, the shaft bearing 45, and the magnetism detection substrate 12.

The spindle gear 21 is attached to a base portion 5*a* of the shaft 5 projecting to the upper surface 9*a* of the motor body 9. The plurality of counter-shaft gears 22, 23, and 24 mesh with the spindle gear 21. The numbers of teeth of the spindle gear 21 and the respective counter-shaft gears 22, 23, and 24 are set to be different from one another.

The plurality of magnets 32, 33, and 34 are permanent magnets. The plurality of magnets 32, 33, and 34 are provided to correspond to the respective plurality of counter-shaft gears 22, 23, and 24. In other words, the magnet 32 is provided in the counter-shaft gear 22, the magnet 33 is provided in the counter-shaft gear 23, and the magnet 34 is provided in the counter-shaft gear 24. Accordingly, the magnets 32, 33, and 34 rotate together with the counter-shaft gears 22, 23, and 24 corresponding thereto.

The plurality of bearings 42, 43, and 44 are provided in the base section 20 and support the respective plurality of counter-shaft gears 22, 23, and 24. The plurality of bearings 42, 43, and 44 are provided to correspond to the respective plurality of counter-shaft gears 22, 23, and 24. The plurality of bearings 42, 43, and 44 turnably attach the plurality of counter-shaft gears 22, 23, and 24 to the base section 20. In other words, the bearing 42 has an annular shape and turnably attaches the counter-shaft gear 22 to the base section 20, the bearing 43 has an annular shape and turnably attaches the counter-shaft gear 23 to the base section 20, and the bearing 44 has an annular shape and turnably attaches the counter-shaft gear 23 to the base section 20.

In this embodiment, the plurality of counter-shaft gears 22, 23, and 24 have the same configuration except that outer diameters are different depending on the numbers of teeth. The plurality of magnets 32, 33, and 34 have the same configuration. The plurality of bearings 42, 43, and 44 have the same configuration. The plurality of magnets 32, 33, and 34 may have different sizes depending on the counter-shaft gears 22, 23, and 24 corresponding thereto. The plurality of bearings 42, 43, and 44 may have different sizes depending on the counter-shaft gears 22, 23, and 24 corresponding thereto.

In this embodiment, any one of the counter-shaft gears 22, 23, and 24 is equivalent to the "counter-shaft gear". For example, when the counter-shaft gear 22 is equivalent to the "counter-shaft gear", the bearing 42 is equivalent to the "bearing member" corresponding to the counter-shaft gear 22 and the magnet 32 is equivalent to the "magnet" corresponding to the counter-shaft gear 22.

The retaining section 25 of the base section 20 includes a first bearing retaining section 25*a* and a second bearing retaining section 25*b*. The first bearing retaining section 25*a* is provided on the upper surface side of the retaining section 25. The second bearing retaining section 25*b* is provided on the lower surface side of the retaining section 25.

The first bearing retaining section 25*a* is a recess for retaining the shaft bearing 45. The second bearing retaining section 25*b* is a recess for retaining the bearings 42, 43, and 44.

A through-hole 25*a*1 for inserting the shaft 5 of the motor 10 is formed in the first bearing retaining section 25*a*. The inner diameter of the through-hole 25*a*1 is larger than the outer diameter of the shaft 5. The shaft bearing 45 is retained by being fit, that is, pressed in the end portion on the upper side in the through-hole 25*a*1. The shaft bearing 45 is provided to fill a gap formed between the inner surface of the through-hole 25*a*1 and the outer surface of the shaft 5. A member that fills the gap formed between the inner surface of the through-hole 25*a*1 and the outer surface of the shaft 5 is not limited to the shaft bearing 45 and may be, for example, an oil seal.

In this embodiment, a part of the outer circumferential surface of the first bearing retaining section 25*a* also functions as a supporting member that supports the magnetism detection substrate 12. The magnetism detection substrate 12 is fit in and fixed to, for example, the outer circumferential surface of the first bearing retaining section 25*a*. With the encoder 11 according to this embodiment, since the counter-shaft gears 22, 23, and 24 and the magnetism detection substrate 12 are fixed to the base section 20, the counter-shaft gears 22, 23, and 24 and the magnetism detection substrate 12 are less easily affected by tolerance and thermal expansion compared with structure in which the counter-shaft gears 22, 23, and 24 and the magnetism detection substrate 12 are supported by another member. Accordingly, since assembly accuracy of the encoder 11 is improved, the magnetism detection substrate 12 can obtain high detection accuracy.

The magnetism detection substrate 12 includes a plurality of magnetic sensors 52, 53, and 54. The magnetic sensor 52 detects a change in a magnetic field by the magnet 32 caused by rotation of the counter-shaft gear 22. The magnetism detection substrate 12 detects a rotation angle of the counter-shaft gear 22 from the change in the magnetic field detected by the magnetic sensor 52.

The magnetic sensor 53 detects a change in a magnetic field by the magnet 33 caused by rotation of the counter-shaft gear 23. The magnetism detection substrate 12 detects a rotation angle of the counter-shaft gear 23 from the change in the magnetic field detected by the magnetic sensor 53.

The magnetic sensor 54 detects a change in a magnetic field by the magnet 34 caused by rotation of the counter-shaft gear 24. The magnetism detection substrate 12 detects a rotation angle of the counter-shaft gear 24 from the change in the magnetic field detected by the magnetic sensor 54.

The magnetism detection substrate 12 is electrically coupled to the control device 4. The magnetism detection substrate 12 transmits detection results of the magnetic sensors 52, 53, and 54, that is, the rotation angles of the counter-shaft gears 22, 23, and 24 to the control device 4.

The peripheral wall section 26 of the base section 20 is a tubular part coupled to the outer edge portion of the retaining section 25. The retaining section 25 is located further on the upper side than a lower end face 26a of the peripheral wall section 26 and further on the lower side than an upper end face 26b of the peripheral wall section 26. In other words, the retaining section 25 is recessed further to the upper side than the lower end face 26a of the peripheral wall section 26 and is recessed further to the lower side than the upper end face 26b of the peripheral wall section 26. The optical sensor substrate 13 is attached to the upper end face 26b of the peripheral wall section 26. The optical sensor substrate 13 is attached to the upper end face 26b via a screw member 17.

In a state in which the encoder 11 is attached to the motor body 9, a first space K1 surrounded by the optical sensor substrate 13, the peripheral wall 26, the retaining section 25, and the shaft bearing 45 and a second space K2 surrounded by the peripheral wall section 26, the retaining section 25, and the upper surface 9a of the motor 10 are formed. In other words, the first space K1 and the second space K2 are partitioned by at least the retaining section 25 of the base section 20. The retaining section 25 is equivalent to the "wall section".

In this embodiment, the first space K1 is a space in which the magnetism detection substrate 12 or the encoder wheel 14 is disposed. The second space K2 is a space in which the spindle gear 21 and the plurality of counter-shaft gears 22, 23, and 24 are disposed. Since the first space K1 and the second space K2 are separated, for example, by keeping, in the second space K2, foreign matters such as grease applied to the gears and abrasion powder caused by meshing of the spindle gear 21 and the counter-shaft gears 22, 23, and 24, it is possible to suppress the foreign matters from entering the first space K1. Accordingly, adhesion of the foreign matters to the magnetism detection substrate 12 or the encoder wheel 14 disposed in the first space K1 is suppressed. Therefore, it is possible suppress occurrence of deficiencies such as deterioration in detection accuracy by the magnetism detection substrate 12 and deterioration in detection accuracy due to difficulty in transmission of light through the encoder wheel 14.

When it is desired to suppress only the adhesion of the foreign matters to the encoder wheel 14, the retaining section 25 of the base section 20 may be disposed between the encoder wheel 14 and the plurality of counter-shaft gears 22, 23, and 24. A member that partitions the first space K1 and the second space K2 is not limited to only the retaining section 25 of the base section 20. For example, the first space K1 and the second space K2 may be partitioned by the retaining section 25 and the shaft bearing 45, may be partitioned by the retaining section 25 and the bearing 42, or may be partitioned by the retaining section 25, the shaft bearing 45, and the bearing 42.

The first space K1 and the second space K2 may be partitioned by another member instead of the retaining section 25. When another member is used, for example, the first space K1 and the second space K2 may be partitioned by the magnetism detection substrate 12, may be partitioned by the magnetism detection substrate 12 and the shaft bearing 45, may be partitioned by the magnetism detection substrate 12 and the bearing 42, or may be partitioned by the magnetism detection substrate 12, the shaft bearing 45, and the bearing 42. When the first space K1 and the second space K2 are partitioned using the magnetism detection substrate 12 in this way, it is possible to suppress adhesion of foreign matters to the encoder wheel 14.

The magnetism detection substrate 12 includes a light source 16. The light source 16 is configured from, for example, an LED. The light source 16 irradiates light toward the encoder wheel 14. In this embodiment, the encoder wheel 14 is attached to a distal end portion 5b of the shaft 5. The encoder wheel 14 is a wheel that transmits light emitted from the light source 16. The light transmitted through the encoder wheel 14 is made incident on the optical sensor substrate 13.

The optical sensor substrate 13 includes an optical sensor 15 that detects the transmitted light transmitted through the encoder wheel 14. The optical sensor 15 detects a change in the transmitted light transmitted through the encoder wheel 14, which rotates together with the shaft 5, to highly accurately detect a rotation angle (0° or more and less than 360°) of the spindle gear 21 attached to the shaft 5.

The optical sensor substrate 13 is electrically coupled to the control device 4. The optical sensor substrate 13 transmits a detection result of the optical sensor 15, that is, the rotation angle of the spindle gear 21 to the control device 4.

In this way, the control device 4 acquires the rotation angle of the spindle gear 21 and the rotation angles of the counter-shaft gears 22, 23, and 24. Since the rotation angles of the respective counter-shaft gears 22, 23, and 24 with respect to the rotation angle of the spindle gear 21 are different from one another as explained above, the control device 4 calculates rotating speed of the spindle gear 21 from a combination of the rotation angles. In other words, the control device 4 calculates rotating speed of the shaft 5 of the motor 10 from a combination of the rotation angles of the spindle gear 21 and the counter-shaft gears 22, 23, and 24. The control device 4 controls driving of the motor 10 using the calculated rotating speed of the shaft 5.

The second bearing retaining section 25b of the retaining section 25 includes a plurality of recesses for retaining the bearings 42, 43, and 44. In FIG. 3, only a recess for retaining the bearing 42 among the plurality of recesses configuring the second bearing retaining section 25b is shown. However, recesses for retaining the bearings 43 and 44 are also formed in not-shown regions in the retaining section 25.

In the following explanation, referring to the counter-shaft gear 22, the magnet 32, and the bearing 42 shown in FIG. 3 as an example, an attachment structure for attaching the counter-shaft gear 22, the magnet 32, and the bearing 42 to the base section 20 is explained.

The counter-shaft gear 22 includes a supporting portion 22a inserted into the bearing 42 and a gear portion 22b having a cylindrical shape, in the outer circumference of which teeth are formed. The bearing 42 is fit in a recess configuring the second bearing retaining section 25b. The bearing 42 may be retained in a recess 29 by adhesion.

In this embodiment, the bearing 42 and the magnet 32 are disposed such that at least a part of the bearing 42 and at least a part of the magnet 32 overlap in a plan view from the direction in which the X axis or the Y axis extends. In other words, the magnet 32 is disposed in the bearing 42 having an annular shape. Specifically, the magnet 32 is provided in a recess 22a2 provided on an upper surface 22a1 of the supporting portion 22a of the counter-shaft gear 22. The plan view from the direction in which the X axis or the Y axis extends means a plan view of the encoder 11 from a position separated from the encoder 11 in the direction along the X axis or the Y axis.

The entire magnet 32 overlaps the bearing 42 attached to the supporting portion 22a of the counter-shaft gear 22. An upper surface 32a of the magnet 32 is flush with an upper surface 42a of the bearing 42. The upper surface 32a of the magnet 32 is flush with the upper surface 22a1 of the supporting portion 22a. In other words, the upper surface 32a of the magnet 32, the upper surface 22a1 of the supporting portion 22a, and the upper surface 42a of the bearing 42 are flush with one another in the up-down direction.

In this embodiment, the recess 22a2 is equivalent to the "recess".

The same applies to an attachment structure for attaching the counter-shaft gear 23, the magnet 33, and the bearing 43 to the base section 20. In other words, in this embodiment, the bearing 43 and the magnet 33 are disposed such that at least parts thereof overlap in the plan view from the direction in which the X axis or the Y axis extends.

The same applies to an attachment structure for attaching the counter-shaft gear 24, the magnet 34, and the bearing 44 to the base section 20. In other words, in this embodiment, the bearing 44 and the magnet 34 are disposed such that at least parts thereof overlap in the plan view from the direction in which the X axis or the Y axis extends.

Figure 5A:
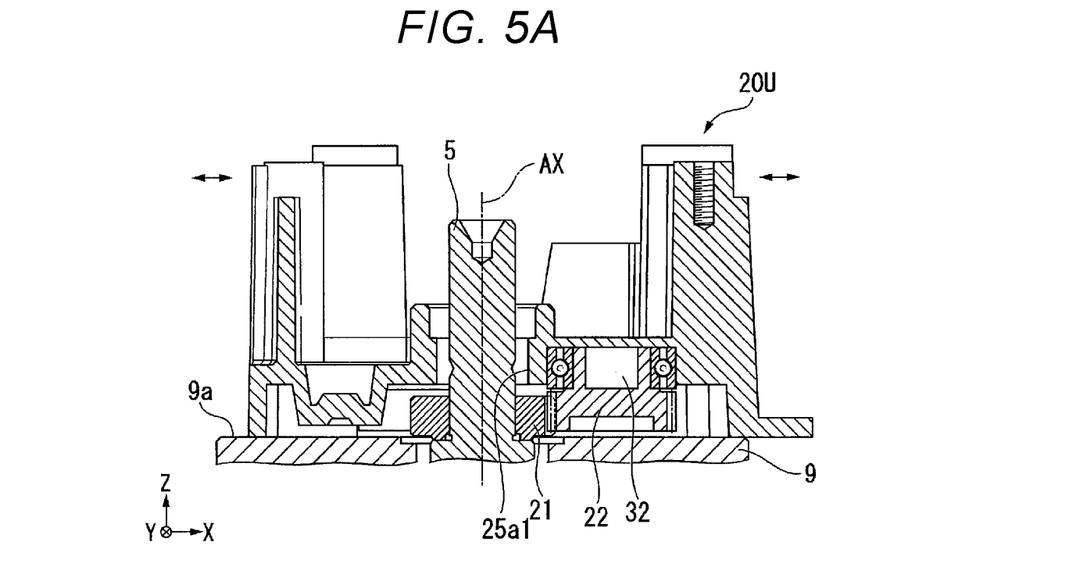
FIG. 5A is a diagram showing a method of attaching the encoder.
Figure 5B:
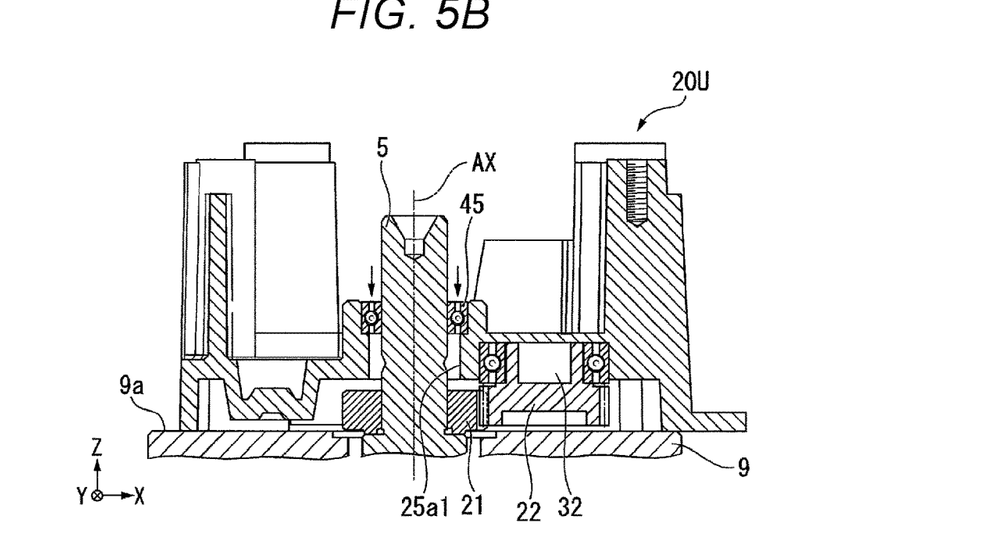
FIG. 5B is a diagram showing the method of attaching the encoder.

Subsequently, a method of assembling the motor 10 according to this embodiment is explained. In other words, a method of attaching the encoder 11 to the motor body 9 is explained. FIGS. 5A and 5B are diagrams showing the method of attaching the encoder 11.

As shown in FIG. 5A, a unit body 20U, in which the plurality of counter-shaft gears 22, 23, and 24, the plurality of magnets 32, 33, and 34, and the plurality of bearings 42, 43, and 44 are attached to the base section 20, is attached to the upper surface 9a of the motor body 9. Specifically, the shaft 5 extending from the motor body 9 is inserted into the through-hole 25a1 provided in the first bearing retaining section 25a of the base section 20 to attach the unit body 20U to the upper surface 9a of the motor body 9.

When the unit body 20U is attached to the motor body 9, the plurality of counter-shaft gears 22, 23, and 24 and the spindle gear 21 attached to the shaft 5 need to be meshed with each other. However, since the plurality of counter-shaft gears 22, 23, and 24 are attached to the lower side of the unit body 20U, when the unit body 20U is attached, the plurality of counter-shaft gears 22, 23, and 24 cannot be seen.

For example, it is assumed that the inner diameter of the through-hole 25a1 and the outer diameter of the shaft 5 substantially coincide. In this case, that is, when the shaft bearing 45 is not provided, the unit body 20U, in which the shaft 5 is inserted into the through-hole 25a1, cannot be moved in the radial direction of the shaft 5. Therefore, it is extremely difficult to mesh the plurality of counter-shaft gears 22, 23, and 24 and the spindle gear 21 without visually checking the plurality of counter-shaft gears 22, 23, and 24 and the spindle gear 21. Therefore, work for attaching the encoder 11 to the motor body 9 is extremely complicated.

On the other hand, in the motor 10 according to this embodiment, as shown in FIG. 5A, the inner diameter of the through-hole 25a1 is larger than the outer diameter of the shaft 5. Therefore, the unit body 20U is movable in the radial direction of the shaft 5 in a state in which the shaft 5 is inserted into the through-hole 25a1.

Therefore, according to this embodiment, by moving the unit body 20U in the radial direction of the shaft 5 in a state in which the shaft 5 is inserted into the through-hole 25a1, it is possible to easily mesh the plurality of counter-shaft gears 22, 23, and 24 attached to the unit body 20U and the spindle gear 21 attached to the shaft 5 without visually checking the plurality of counter-shaft gears 22, 23, and 24 and the spindle gear 21. Therefore, the work for attaching the encoder 11 to the motor body 9 is facilitated.

Subsequently, in a state in which the plurality of counter-shaft gears 22, 23, and 24 and the spindle gear 21 are meshed, as shown in FIG. 5B, the shaft bearing 45, into which the shaft 5 is inserted, is fit in the first bearing retaining section 25a. Consequently, the positions of the shaft 5 and the base section 20 are fixed. After the shaft bearing 45 is attached, the unit body 20U is fixed to the motor body 9 via a not-shown screw member.

Subsequently, the magnetism detection substrate 12 shown in FIG. 3 is attached to the first bearing retaining section 25a of the base section 20. According to this embodiment, since the counter-shaft gears 22, 23, and 24 and the magnetism detection substrate 12 are fixed to the base section 20, it is possible to reduce assembly tolerance compared with structure in which the counter-shaft gears 22, 23, and 24 and the magnetism detection substrate 12 are supported by another member.

Subsequently, the encoder wheel 14 shown in FIG. 3 is attached to the distal end portion 5b of the shaft 5. Thereafter, the optical sensor substrate 13 is attached to the base section 20 (the upper end face 26b of the peripheral wall section 26) to complete the attachment of the encoder 11 to the motor body 9.

With the encoder 11 according to this embodiment, the magnets 32, 33, and 34 are disposed in the bearings 42, 43, and 44. In other words, the bearings 42, 43, and 44 and the magnets 32, 33, and 34 are disposed to overlap when viewed from the X axis or the Y axis. Accordingly, compared with structure in which the magnets 32, 33, and 34 are not disposed in the bearings 42, 43, and 44, it is possible to reduce a dimension in the Z axis (the first axis) along which the shaft 5 extends. Consequently, with the motor 10 including the encoder 11, the motor 10 is reduced in size in a direction in which the shaft 5 extends.

With the robot 1 according to this embodiment, since the motor 10 reduced in size in the direction in which the shaft 5 extends is used as the driving section M, it is possible to improve design flexibility of the driving section M.

In the motor 10 according to the embodiment, as an example, the magnet 32 is disposed in the recess 22a2 such that the upper surface 32a of the magnet 32 and the upper surface 22a1 of the supporting portion 22a are flush with each other. However, the present disclosure is not limited to this. The position of the upper surface 32a of the magnet 32 can be changed as appropriate according to the distance between the upper surface 32a and the magnetism detection substrate 12.

Figure 6A:
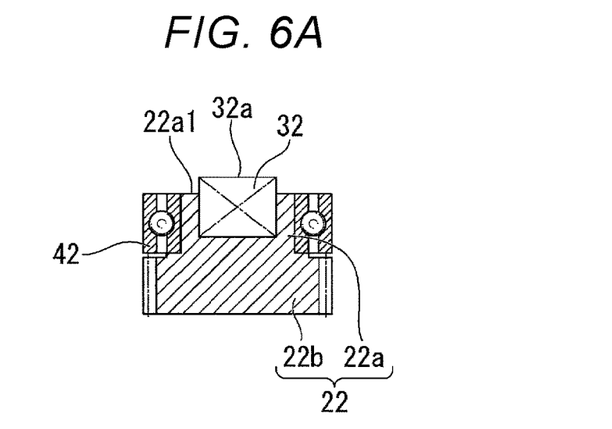
FIG. 6A is a diagram showing a configuration according to a modification of the first embodiment.
Figure 6B:
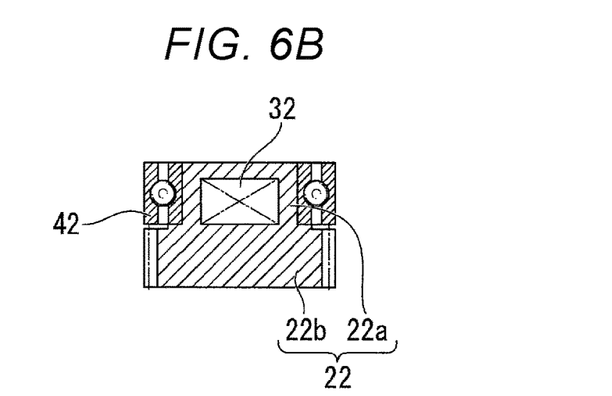
FIG. 6B is a diagram showing a configuration according to a modification of the first embodiment.

For example, as shown in FIG. 6A, the upper surface 32a of the magnet 32 may be disposed in a projecting state from the upper surface 22a1 of the supporting portion 22a. As shown in FIG. 6B, the magnet 32 may be provided in a completely embedded state in the supporting portion 22a of the counter-shaft gear 22.

When the recess 22a2 is formed to reach the gear portion 22b, apart of the magnet 32 may overlap the gear portion 22b in the plan view from the direction in which the X axis or the Y axis extends.

Second Embodiment

Subsequently, a motor according to a second embodiment is explained. This embodiment and the first embodiment are the same except that the configuration of an encoder is different. Therefore, in the following explanation, members and components same as those in the first embodiment are denoted by the same reference numerals and signs and explanation of the members and the components is omitted.

Figure 7:
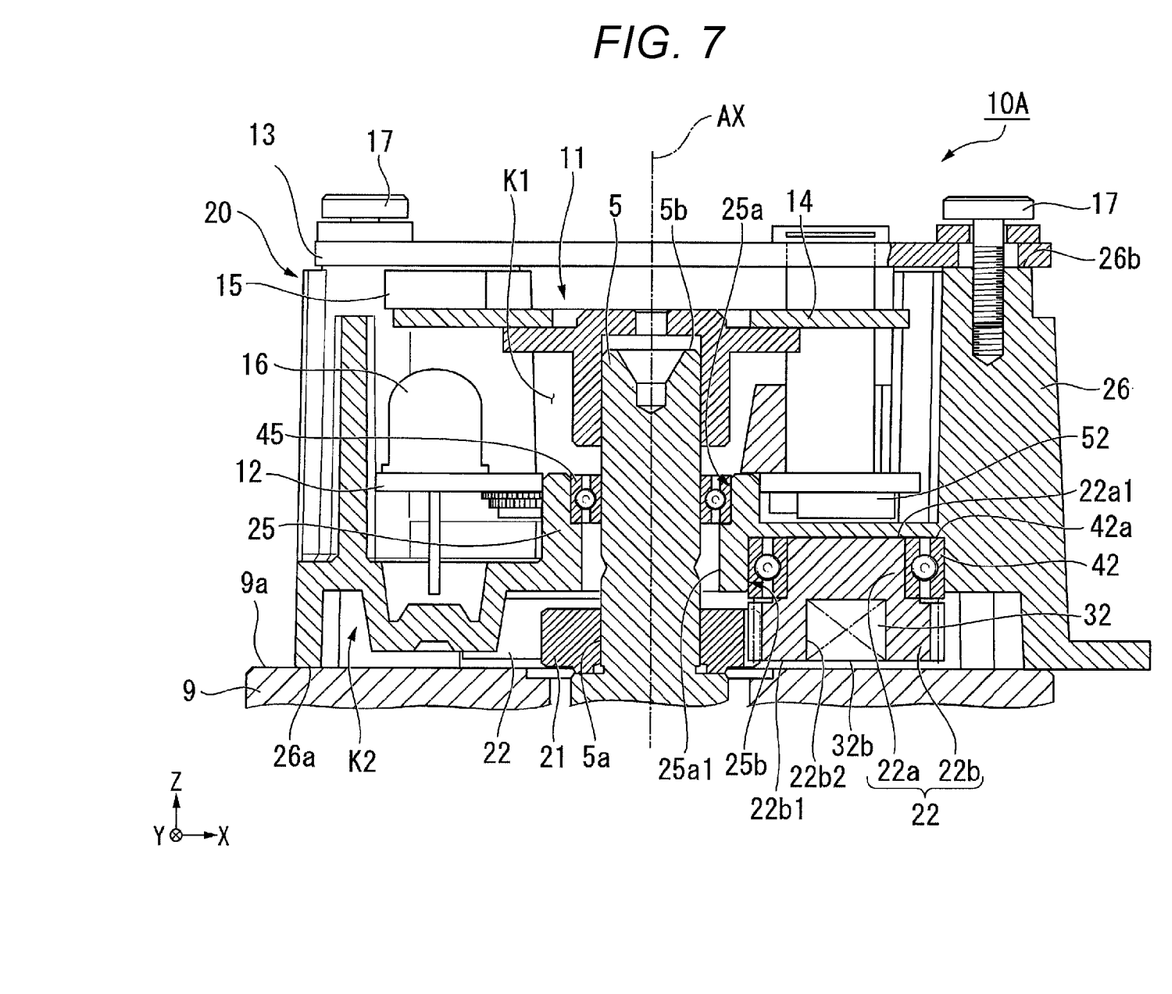
FIG. 7 is a sectional view showing a main part configuration of a motor according to a second embodiment.

FIG. 7 is a sectional view showing a main part configuration of the motor according to this embodiment. FIG. 7 is a diagram corresponding to FIG. 3 in the first embodiment.

In this embodiment, as in the first embodiment, referring to the counter-shaft gear 22, the magnet 32, and the bearing 42 shown in FIG. 3 as an example, attachment structure for attaching the counter-shaft gear 22, the magnet 32, and the bearing 42 to the base section 20 is explained.

As shown in FIG. 7, in an encoder 11A according to this embodiment, the magnet 32 is provided in a recess 22b2 provided in a lower surface 22b1 of the gear portion 22b of the counter-shaft gear 22. The entire magnet 32 overlaps the gear portion 22b of the counter-shaft gear 22 in the up-down direction. A lower surface 32b of the magnet 32 is flush with the upper surface 42a of the gear portion 22b. In this embodiment, the recess 22b2 is equivalent to the "recess".

The same applies to attachment structure for attaching the counter-shaft gear 23, the magnet 33, and the bearing 43 to the base section 20. In other words, in this embodiment, a gear portion of the counter-shaft gear 23 and the magnet 33 are disposed such that at least parts of the gear portion and the magnet 33 overlap in the plan view from the direction in which the X axis or the Y axis extends.

The same applies to attachment structure for attaching the counter-shaft gear 24, the magnet 34, and the bearing 44 to the base section 20. In other words, in this embodiment, a gear portion of the counter-shaft gear 24 and the magnet 34 are disposed such that at least parts of the gear portion and the magnet 34 overlap in the plan view from the direction in which the X axis or the Y axis extends.

With the encoder 11A according to this embodiment, the magnets 32, 33, and 34 are disposed in the gear portions of the counter-shaft gears 22, 23, and 24. In other words, the gear portions of the counter-shaft gears 22, 23, and 24 and the magnets 32, 33, and 34 are disposed to overlap in the plan view from the direction in which the X axis or the Y axis extends. Accordingly, compared with structure in which the magnets 32, 33, and 34 are not disposed in the gear portions of the counter-shaft gears 22, 23, and 24, it is possible to reduce a dimension in the Z axis (the first axis) along which the shaft 5 extends. Accordingly, with a motor 10A including the encoder 11A, the motor 10A is reduced in size in the direction in which the shaft 5 extends.

It is possible to improve design flexibility in a driving section of a robot by using the motor 10A in the driving section of the robot.

In the motor 10A according to this embodiment, as an example, the magnet 32 is disposed in the recess 22b2 such that the lower surface 32b of the magnet 32 and the lower surface 22b1 of the gear portion 22b are flush with each other. However, the present disclosure is not limited to this. The position of the lower surface 32b of the magnet 32 can be changed as appropriate according to the distance between the lower surface 32b and the magnetism detection substrate 12.

Figure 8A:
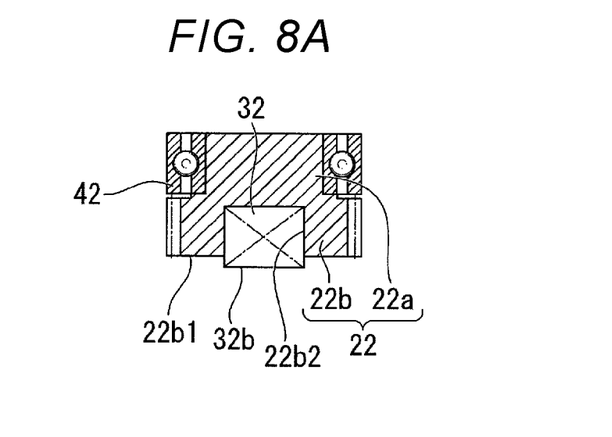
FIG. 8A is a diagram showing a configuration according to a modification of the second embodiment.
Figure 8B:
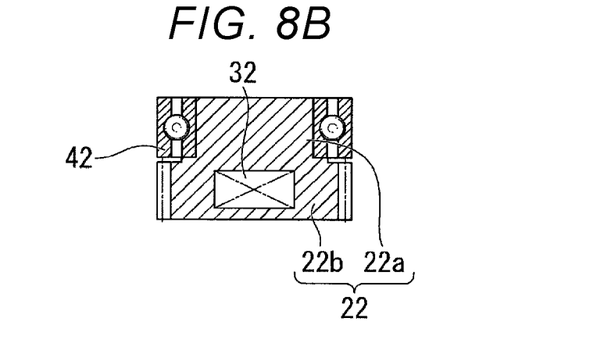
FIG. 8B is a diagram showing a configuration according to a modification of the second embodiment.

For example, as shown in FIG. 8A, the lower surface 32b of the magnet 32 may be disposed in a projecting state from the lower surface 22b1 of the gear portion 22b. As shown in FIG. 8B, the magnet 32 may be provided in a completely embedded state in the gear portion 22b of the counter-shaft gear 22.

When the recess 22b2 is formed to reach the supporting portion 22a, a part of the magnet 32 may overlap the supporting portion 22a in the plan view from the direction in which the X axis or the Y axis extends.

The present disclosure is not limited to the contents of the embodiments and can be changed as appropriate in a range not departing from the gist of the present disclosure.

In the encoders 11 and 11A according to the embodiments, as an example, the spindle gear 21 and the counter-shaft gears 22, 23, and 24 are disposed on the lower side of the retaining section 25 of the base section 20. In other words, in the configuration explained above, the spindle gear 21 and the counter-shaft gears 22, 23, and 24 are disposed further on the lower side than the magnetism detection substrate 12. However, the present disclosure is not limited to this. The encoder of the present disclosure is also applicable to a form in which the spindle gear 21 and the counter-shaft gears 22, 23, and 24 are disposed on the upper side of the retaining section 25 of the base section 20, that is, the spindle gear 21 and the counter-shaft gears 22, 23, and 24 are disposed further on the upper side than the magnetism detection substrate 12.

What is claimed is:

1. An encoder comprising:
   a base;
   a spindle gear attached to a turning shaft;
   a counter-shaft gear configured to mesh with the spindle gear and including a cylindrical gear section and a supporting section, the cylindrical gear section including a plurality of teeth to mesh with the spindle gear;
   a magnet provided in the counter-shaft gear; and
   an annular bearing member provided in the base and configured to support the counter-shaft gear about the supporting section, wherein
   a first axis is a longitudinal axis of the turning shaft and a second axis extends orthogonal to the first axis, and
   the magnet is disposed to overlap the bearing member in a plan view when viewed in an axial direction of the second axis.

2. The encoder according to claim 1, wherein
   the counter-shaft gear includes a recess in a position overlapping the bearing member in the plan view from the direction in which the second shaft extends, and
   the magnet is disposed in the recess.

3. The encoder according to claim 1, further comprising a magnetism detection substrate configured to detect a change in a magnetic field due to the magnet, and
   the magnetism detection substrate is provided in the base section.

4. The encoder according to claim 3, wherein
   the base section includes a wall section, and
   the wall section is disposed between a magnetic sensor of the magnetism detection substrate and the magnet of the counter-shaft gear.

5. A motor comprising the encoder according to claim 1.

6. A robot comprising the motor according to claim 5.

7. An encoder comprising:
   a base;
   a spindle gear attached to a turning shaft;
   a counter-shaft gear configured to mesh with the spindle gear and including a cylindrical gear section and a supporting section, the cylindrical gear section including a plurality of teeth to mesh with the spindle gear;

a magnet provided in the counter-shaft gear; and an annular bearing member provided in the base and configured to support the counter-shaft gear about the supporting section, wherein a first axis is a longitudinal axis of the turning shaft and a second axis extends orthogonal to the first axis, and the magnet is disposed to overlap the cylindrical gear section in a plan view when viewed in an axial direction of the second axis.

8. The encoder according to claim 7, wherein the counter-shaft gear includes a recess in a position overlapping the gear section in the plan view from the direction in which the second shaft extends, and the magnet is disposed in the recess.

\* \* \* \* \*